(12) United States Patent
Owens et al.

(10) Patent No.: US 8,031,846 B2
(45) Date of Patent: ***Oct. 4, 2011

(54) ELECTRONIC MAIL DISTRIBUTION SYSTEM FOR INTEGRATED ELECTRONIC COMMUNICATIONS

(75) Inventors: Stephen J. H. Owens, Plano, TX (US);
Michael S. Finney, Hilliard, OH (US);
Michael L. Snider, Columbus, OH (US); Randall S. Wright, Worthington, OH (US); James W. Paynter, Hilliard, OH (US); Robin R. Bard, Dublin, OH (US)

(73) Assignee: Cranberry Properties, LLC, Dulles, VA (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/407,869

(22) Filed: Mar. 20, 2009

(65) Prior Publication Data
US 2009/0182828 A1 Jul. 16, 2009

Related U.S. Application Data

(63) Continuation of application No. 11/536,147, filed on Sep. 28, 2006, now Pat. No. 7,508,924, which is a continuation of application No. 10/893,042, filed on Jul. 16, 2004, now Pat. No. 7,116,766, which is a continuation of application No. 10/050,754, filed on Jan. 16, 2002, now abandoned, which is a continuation of application No. 09/431,338, filed on Oct. 29, 1999, now abandoned, which is a continuation of application No. 08/877,614, filed on Jun. 17, 1997, now Pat. No. 6,023,700.

(51) Int. Cl.
*H04M 11/00* (2006.01)

(52) U.S. Cl. .................... 379/93.24; 379/93.15

(58) Field of Classification Search ............... 379/93.24, 379/93.15, 88.14, 88.13, 100.15, 100.13; 709/206
See application file for complete search history.

(56) References Cited

U.S. PATENT DOCUMENTS
4,531,184 A 7/1985 Wigan et al.
(Continued)

FOREIGN PATENT DOCUMENTS
EP 0565850 A1 10/1993
(Continued)

OTHER PUBLICATIONS

C. J. Barter, "Transaction Processing in Message Passing Systems," Proceedings of the 6th Australian Computer Science Conference, Sydney, NSW, Australia, Feb. 10-12, 1983, pp. 177-186.

(Continued)

*Primary Examiner* — Stella Woo
(74) *Attorney, Agent, or Firm* — Standley Law Group LLP

(57) ABSTRACT

A system is disclosed for integrated electronic mail, voice mail, and fax mail messaging. A common message format is defined for use by an electronic mail service and a telecommunications service so electronic mail messages that may include voice and fax mail attachments may be exchanged between the services. Message senders and receivers may choose from a variety of filter and forward options that allow them to manage their communications and specify a preference for receiving messages at the electronic mail or telecommunications service. Forwarding and conversion of messages is performed automatically. The options are used to define a set of rules to be applied to inbound and outbound messages so that messages are sent and received in accordance with the preferences of the senders and receivers.

20 Claims, 3 Drawing Sheets

U.S. PATENT DOCUMENTS

| | | |
|---|---|---|
| 4,837,798 A | 6/1989 | Cohen et al. |
| 4,935,954 A | 6/1990 | Thompson et al. |
| 4,951,196 A | 8/1990 | Jackson |
| 5,088,032 A | 2/1992 | Bosack |
| 5,138,653 A | 8/1992 | Le Clercq |
| 5,146,488 A | 9/1992 | Okada et al. |
| 5,193,110 A | 3/1993 | Jones et al. |
| 5,263,157 A | 11/1993 | Janis |
| 5,276,869 A | 1/1994 | Forrest et al. |
| 5,283,856 A | 2/1994 | Gross et al. |
| 5,287,199 A | 2/1994 | Zoccolillo |
| 5,317,568 A | 5/1994 | Bixby et al. |
| 5,317,628 A | 5/1994 | Misholi et al. |
| 5,333,266 A | 7/1994 | Boaz et al. |
| 5,349,636 A | 9/1994 | Irribarren |
| 5,410,543 A | 4/1995 | Seitz et al. |
| 5,438,611 A | 8/1995 | Campana, Jr. et al. |
| 5,475,738 A | 12/1995 | Penzias |
| 5,479,411 A | 12/1995 | Klein |
| 5,483,580 A | 1/1996 | Brandman et al. |
| 5,487,100 A | 1/1996 | Kane |
| 5,497,373 A | 3/1996 | Hulen et al. |
| 5,524,137 A | 6/1996 | Rhee |
| 5,530,740 A | 6/1996 | Irribarren et al. |
| 5,555,346 A | 9/1996 | Gross et al. |
| 5,559,611 A | 9/1996 | Bloomfield et al. |
| 5,606,668 A | 2/1997 | Shwed |
| 5,608,786 A | 3/1997 | Gordon |
| 5,608,874 A | 3/1997 | Ogawa et al. |
| 5,619,648 A | 4/1997 | Canale et al. |
| 5,633,916 A | 5/1997 | Goldhagen et al. |
| 5,646,981 A | 7/1997 | Klein |
| 5,647,002 A | 7/1997 | Brunson |
| 5,675,507 A | 10/1997 | Bobo, II |
| 5,737,395 A | 4/1998 | Irribarren |
| 5,740,231 A | 4/1998 | Cohn et al. |
| 5,742,668 A | 4/1998 | Pepe et al. |
| 5,742,905 A | 4/1998 | Pepe et al. |
| 5,758,088 A | 5/1998 | Bezaire et al. |
| 5,765,170 A | 6/1998 | Morikawa |
| 5,825,854 A | 10/1998 | Larson et al. |
| 5,872,926 A | 2/1999 | Levac et al. |
| 5,937,161 A | 8/1999 | Mulligan et al. |
| 5,987,100 A | 11/1999 | Fortman et al. |
| 5,991,365 A | 11/1999 | Pizano et al. |
| 6,020,980 A | 2/2000 | Freeman |
| 6,023,700 A | 2/2000 | Owens et al. |
| 6,157,706 A | 12/2000 | Rachelson |
| 6,233,318 B1 | 5/2001 | Picard et al. |
| 6,304,573 B1 | 10/2001 | Hicks, III |
| 6,374,291 B1 | 4/2002 | Ishibashi et al. |
| 6,633,630 B1 | 10/2003 | Owens et al. |
| 6,697,459 B2 | 2/2004 | Finnigan |
| 7,116,766 B2 * | 10/2006 | Owens et al. ............... 379/93.24 |
| 7,508,924 B2 * | 3/2009 | Owens et al. ............... 379/93.24 |

FOREIGN PATENT DOCUMENTS

| | | |
|---|---|---|
| EP | 0597691 A1 | 5/1994 |
| JP | 9-214559 A | 8/1997 |
| WO | 96/35994 A1 | 11/1996 |
| WO | 96/36142 A1 | 11/1996 |

OTHER PUBLICATIONS

R. B. Robrock II, "The Many Faces of the LIDB Data Base," IEEE, 1992, pp. 1903-1907.

* cited by examiner

ELECTRONIC MAIL DISTRIBUTION SYSTEM FOR INTEGRATED ELECTRONIC COMMUNICATIONS

CROSS-REFERENCES TO RELATED APPLICATIONS

This application is a continuation of U.S. patent application Ser. No. 11/536,147 filed Sep. 28, 2006 entitled ELECTRONIC MAIL DISTRIBUTION SYSTEM FOR INTEGRATED ELECTRONIC COMMUNICATIONS, now U.S. Pat. No. 7,508,924 issued Mar. 24, 2009, which is a continuation of U.S. patent application Ser. No. 10/893,042 filed Jul. 16, 2004 entitled ELECTRONIC MAIL DISTRIBUTION SYSTEM FOR INTEGRATED ELECTRONIC COMMUNICATIONS, now U.S. Pat. No. 7,116,766 issued Oct. 3, 2006, which is a continuation of U.S. patent application Ser. No. 10/050,754 filed Jan. 16, 2002 entitled ELECTRONIC MAIL DISTRIBUTION SYSTEM FOR INTEGRATED ELECTRONIC COMMUNICATIONS, now abandoned, which is a continuation of U.S. patent application Ser. No. 09/431,338 filed Oct. 29, 1999 entitled ELECTRONIC MAIL DISTRIBUTION SYSTEM FOR INTEGRATED ELECTRONIC COMMUNICATIONS, now abandoned, which is a continuation of U.S. patent application Ser. No. 08/877,614 filed Jun. 17, 1997 entitled ELECTRONIC MAIL DISTRIBUTION SYSTEM FOR INTEGRATED ELECTRONIC COMMUNICATIONS, now U.S. Pat. No. 6,023,700 issued Feb. 8, 2000.

BACKGROUND OF THE INVENTION

1. Field of the Invention

The present invention relates generally to communication technologies such as electronic mail (e-mail), voice mail, and facsimile (fax) mail messaging. Particularly, the present invention relates to an electronic mail gateway for integrating communications to facilitate access to electronic mail, voice mail, and fax mail messages.

2. Description of the Related Art

Communications technology today allows individuals to send messages to one another from virtually any location in the world at virtually any time of day. The variety of communication modes (e.g., telephone, computer) and communication media (e.g., e-mail, voice mail, fax mail) available today allows individuals to choose one appropriate for the circumstances.

In general, message senders today may select from a variety of communication media while message receivers are limited to the option selected by the message sender. If the sender uses the telephone to leave a voice mail message, the message receiver is required use a telephone to retrieve the voice mail message. If the sender uses a computer to send an e-mail message, the message receiver is required to use a computer to retrieve the e-mail message. Some days, the message receiver may be unable to retrieve a message because the available communication mode may not be used to retrieve the message. In other instances, even if a message receiver has access to a telephone, a computer, or some other communication device, the receiver may prefer using one device over the others. For example, the receiver may spend most of his working day on a computer and may therefore, prefer to retrieve all of his inbound messages—regardless of the originating communication medium—using his computer.

The inability to alter the message medium after a message has been sent (or to use a communication mode other than the one selected by the sender) unnecessarily burdens both message senders and message receivers. Senders and receivers may be required to select a medium prior to communicating so the parties are assured the communication will be received in a timely manner. If circumstances for the receiver change at any point following selection of the medium and the receiver is unable to notify the sender of the change, the receiver may risk missing the sender's communication because the message may not be accessible using an alternate communication mode. In addition, the inability of a message receiver to retrieve all inbound messages using a single communication mode or device results in additional burdens. Receivers are inconvenienced when they are required to switch, for example, between the telephone to retrieve voice mail messages and the computer to retrieve e-mail messages.

Technologies have been introduced that address the inconveniences imposed by widespread use of different messaging media. For example, Text-To-Speech (TTS) technology allows electronic text messages to be heard by a message receiver. However, message receivers are generally required to integrate this technology into their own customized telecommunications/computer environments. Messages in differing media (e.g., e-mail, voice mail, fax mail) have not been seamlessly integrated so a message receiver may simply choose a preferred messaging medium and have all incoming or inbound messages processed accordingly.

SUMMARY OF THE INVENTION

The present invention addresses the limitations in current communications technology that require receivers to retrieve messages in accordance with a predetermined communication medium or in accordance with the communication mode selected by senders. The present invention is a seamlessly integrated communications system that combines e-mail, voice mail, and fax mail messaging. The cross-media messaging system of the present invention allows messages to be exchanged between electronic mail and telecommunications service providers so all inbound messages—regardless of the originating communication medium—may be retrieved by a message receiver using a telephone or computer.

The present invention is an electronic mail gateway that allows electronic messages to be exchanged between an electronic mail service and a telecommunications service. Messages forwarded from the electronic mail service to the telecommunications service may be retrieved using a telephone. Using a standard telephone, receivers may listen to voice mail messages, redirect fax mail to a fax machine, or "listen" to e-mail messages that originated as text messages and have been forwarded from an electronic mail service to a telecommunications service switch. Messages may also be forwarded from the telecommunications service to the electronic mail service. Using a computer and modem, users may playback voice mail messages, view fax mail messages, or read e-mail messages that originated as voice or fax messages. Messages and/or message attachments which are exchanged using electronic mail messaging technology are automatically reformatted or converted into the appropriate format (e.g., xing protocol, TIFF format.) Message reformatting or conversion is performed automatically at a telecommunications or electronic mail service provider that delivers inbound messages so message receivers need only specify a preferred communication medium to take advantage of the features and functionality of the present invention.

DETAILED DESCRIPTION OF PREFERRED EMBODIMENT(S)

Figure 1:
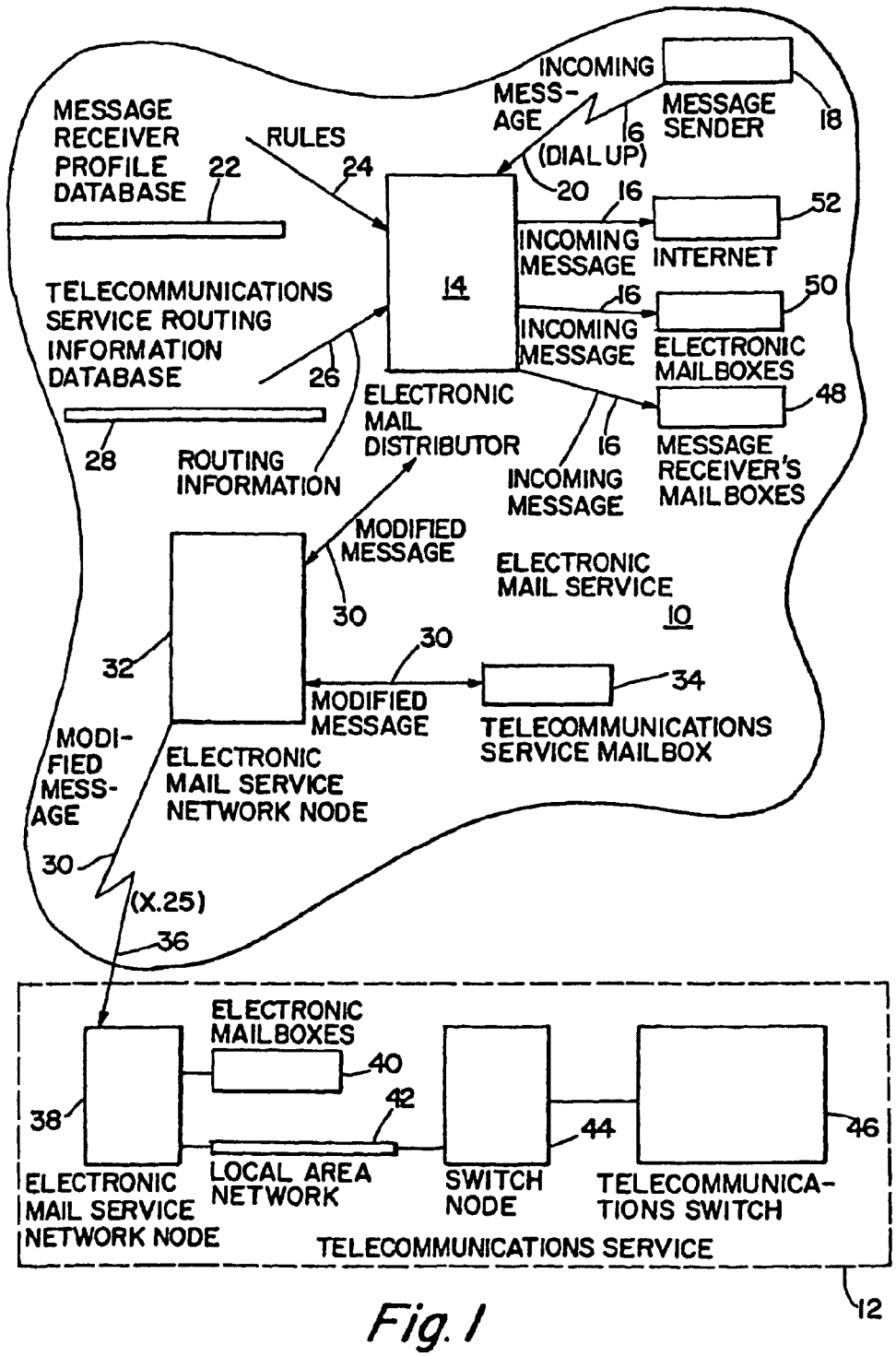
FIG. 1 is a system organization diagram of the primary components for a preferred embodiment of the present invention.

The present invention is a sophisticated computer system that facilitates communications between senders and receivers of e-mail, voice mail, and fax mail messages. The system is comprised of a collection of application programs and services hosted on different computers (or servers) and various devices that are interconnected by an infrastructure or gateway that supports electronic mail communications between the participating entities. In a preferred embodiment of the present invention, the application programs and services as well as the supporting hardware components of the present invention may be developed and maintained by different service providers who cooperate with one another to provide the features and functionality of the present invention. Using this arrangement, each service provider may focus on the development of technology suited to its particular area of expertise. In an alternative embodiment of the present invention, the features and functionality may be developed and maintained by a single service provider or access service. The service provider or access service on which the message receiver relies for delivery of voice mail, e-mail, and fax mail messages knows the receiver's preferences as defined in a set of rules stored in a message receiver or user profile database so all messages may be delivered to the receiver in accordance with his or her preferences. The ability to exchange electronic messages between service providers based on rules defined in accordance with user preferences is unique to the present invention.

The present invention offers a variety of features to both "senders" and "receivers" of messages. Senders are users who address communications to message receivers. Senders use a particular communication mode (e.g., telephone, computer/modem) to send messages. Initially, messages are routed to and stored in a mailbox compatible with the sender's communication mode/medium. For example, messages sent via the telephone may be stored in a voice mailbox. Messages sent via a computer and modem may be stored in an electronic mailbox.

Receivers are the users to whom the individual voice mail, fax mail, and e-mail messages are addressed. Receivers are, preferably, subscribers or users of the telecommunications and/or electronic mail service. Electronic mail services may be provided by an online information service such as the CompuServe Information Service. An online information service such as the CompuServe Information Service may provide Internet access and access to proprietary databases in addition to providing electronic mail services. The information service may be comprised of large number of network nodes or servers that located throughout the world and that are capable of communicating with each other in order to create a global network.

Connection software provided by the electronic mail service allows message receivers to connect to and communicate with the service. Preferably, the connection software is embodied in a graphical user interface that allows users to interact with the service using graphical displays and a pointing device such as a mouse. CompuServe's WinCIM Version 3.0 is an example of connection software that supports access to and interaction with an electronic mail service. To communicate with the service, a subscriber or user establishes a connection with one of the nodes or servers that belongs to the information service.

In addition to providing access to and interacting with an electronic mail service, the connection software allows a user to define rules or filter and forward instructions for managing incoming (inbound) and outgoing (outbound) messages. In addition to other rules or filter and forward instructions, a message receiver may indicate a preferred communication medium by selecting options that define one or more rules to be applied automatically by an electronic mail service provider to inbound messages. For example, a receiver may, by selecting certain options, define a rule to request that messages initiated via the telephone be stored in a voice mailbox and forwarded to an e-mail mailbox for later viewing. Alternatively, a receiver may, by selecting certain options, define a rule to request that messages initiated via a computer/modem (i.e., e-mail messages) be stored in an e-mail mailbox and forwarded to a voice mailbox for later retrieval.

In another embodiment of the present invention, a message receiver may interact with a telephone voice response unit to select options that define rules to be applied to incoming voice and fax mail messages. The rules may be stored in a database at the telecommunications service and applied to incoming messages.

As may be apparent, user preferences may be selected and stored in a database at either the electronic mail service or the telecommunications service. As messages addressed to the receiver arrive at the telecommunications or electronic mail service (either of which facilitates delivery of the message), the receiver's rules are applied by an electronic mail distributor or other message distributor so all forwarding and conversion of messages (if necessary) may be performed automatically. The receiver then uses the appropriate communication mode (e.g., telephone, computer) to retrieve the inbound messages. For example, a receiver may dial into a voice mailbox with a standard telephone and listen to voice mail messages, redirect fax mail to a local fax machine, or "listen" to e-mail messages. Alternatively, a user may dial into an e-mail mailbox with a computer and playback voice mail messages, view fax mail messages, and read e-mail messages.

Referring to FIG. 1, the present invention is an electronic mail gateway that facilitates the exchange of electronic messages between an electronic mail service 10 and a telecommunications service 12 to support cross-media messaging. Messages are exchanged according to a common message format. In a preferred embodiment of the present invention, messages between the electronic mail service 10 and telecommunications service 12 are electronic mail messages that may include voice mail or fax mail attachments. Messages are exchanged between the services based on preferences of users of the system. In a preferred embodiment of the present invention in which electronic mail messages are forwarded to a telecommunications service, an electronic mail distributor 14 located at the electronic mail service 10 examines an incoming message 16 from a user (i.e., message sender) 18 of the electronic mail service 10 who may use dial-up access 20 to send a message to another user (i.e., message receiver) of the service. Alternatively, incoming messages 16 may be forwarded to the service from another electronic mail service or the Internet. The electronic mail distributor 14 which, preferably, is an application program that operates on a server located at the electronic mail service determines the receiver of the message and accesses a Message Receiver Profile Database 22 to determine whether the receiver of the message has rule 24 in his or her profile that indicates the message receiver would like the message to be forwarded to the telecommunications service 12 for later retrieval via the telephone. If the receiver has specified a preference (via a rule in his or her message receiver profile) for receiving incoming messages at the telecommunications service 12, the incoming message 16 is modified by the electronic mail distributor 14 to include telecommunications service routing information 26. The telecommunications service routing information is preferably stored in a Telecommunications Service Routing Information Database 28 which is accessible by the electronic mail distributor 14. For example, information may be stored in service name-routing information pairs within the database 28. A message receiver's profile may include the name of a telecommunications service to which electronic mail messages are to be forwarded. The Telecommunications Service Routing Information Database 28 may include the service name-routing information pair so that the distributor may perform a look-up in the database based on the service name found in the message receiver's profile 22.

The modified electronic message 30 is then forward by the electronic mail distributor 14 to an electronic mailbox 34 in communication with an electronic mail service network node 32 at the electronic mail service 10 and that has been created specifically for the telecommunications service 12. In a preferred embodiment of the present invention, an electronic mail service network node 38 located at the telecommunications service 12 periodically polls the electronic mail service network node 32 at the electronic mail service 10 to determine whether the telecommunications service mailbox 34 contains any modified messages to be forwarded to the telecommunications service 12. The polling operation and the exchange of messages between the services, preferably, is performed using an X.25 link 36 that has been established between the services. Modified messages 30 from the telecommunications service mailbox 34 may then be transmitted from the electronic mail service network node at the electronic mail service 32 via the X.25 link 36 to the electronic service network node at the telecommunications service 38.

Once at the telecommunications service 12, the incoming messages are examined to identify the individual message receivers. Each message receiver's personal messages may then be stored in an electronic mailbox 40 located at the electronic mail service network node 38. A message may then be made available through the telephone switch 46 at the telecommunications service 12 and the message 30 may be retrieved by a message receiver via the telephone. When the message receiver calls the telephone switch 46 to retrieve a message, the telephone switch 46 communicates with the electronic mail service network node 38 via a switch node 44 connected via a local area network 42. A text-to-speech operation performed at the telecommunications service 50 allows the electronic mail message to be heard by the message receiver when he or she calls the switch to hear the message. Alternatively, the message receiver may arrange to receive the electronic mail message at a fax machine specified by the receiver.

Alternatively, if the message receiver does not specify a preference for receiving the incoming message at the telecommunications service, the electronic mail distributor 14 based on other preferences or actions of the message receiver may forward the electronic message 16 to the receiver's mailbox 48 at the electronic mail service 10 or to one or more electronic mailboxes 50 designated for use by other members of the electronic mail service 10. Finally, the message 16 may be forwarded to Internet or another electronic mail service 52.

Figure 2:
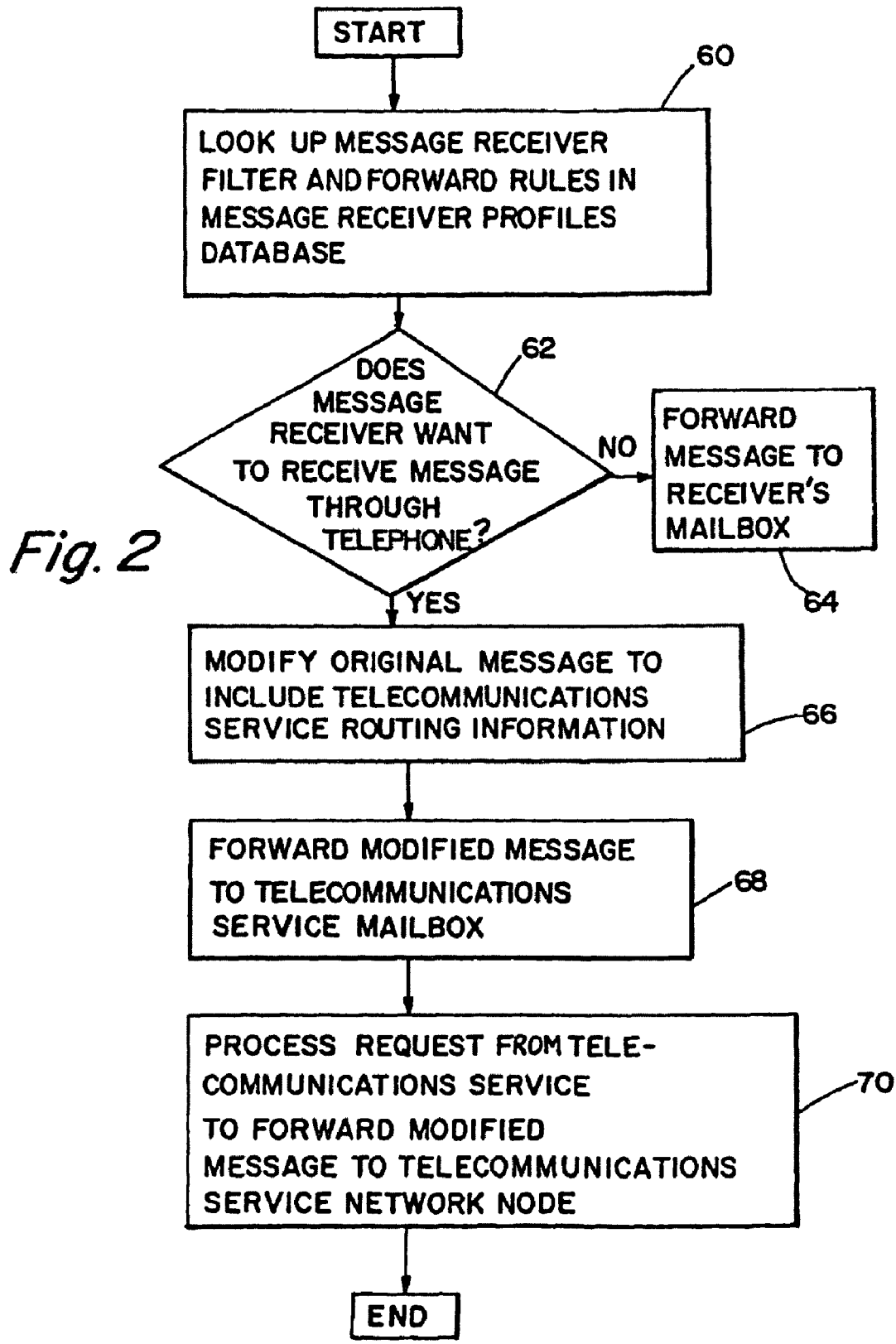
FIG. 2 is a flow chart of the primary steps of the present invention.

Referring to FIG. 2, a flow chart of the primary steps of the present invention is shown for a preferred embodiment of the present invention in which electronic mail messages are forwarded from an electronic mail service to a telecommunications service. The steps or operations shown in FIG. 2, preferably, are performed by the electronic mail distributor of the present invention. When the electronic mail distributor receives an incoming message, it first examines the message receiver preferences or filter and forward instructions as defined in the message receiver's profile stored in the message receiver profile database 60. Preferably, the incoming message is comprised of a message header that includes an identifier for the message receiver or recipient and text for the message. The electronic mail distributor may then lookup the receiver's profile based on the identifier in the header of the message. In the next step, the electronic mail distributor determines, based on information or instructions stored in the profile, whether the message receiver wants the electronic mail message to be forwarded to the telecommunications service 62. If the message receiver does not want the electronic mail message to be forwarded to the telecommunications switch, the electronic mail distributor arranges to forward the message to the message receiver's mailbox located at the electronic mail service, to other service subscribers, or to the Internet or another electronic mail service 64. If the message receiver wants the electronic mail message to be forwarded to the telecommunications switch, the electronic mail distributor modifies the message to include routing information for the telecommunications service electronic mailbox located at the electronic mail service 66. The message is then forwarded to the telecommunications service mailbox 68. Once at the telecommunications service mailbox, messages stored in the mailbox are sent to the electronic mail service network node located at the telecommunications service when the electronic mail service network node located at the telecommunications service polls the mailbox 70. Once at the telecommunications service, the message receiver may retrieve the message via the telephone.

Figure 3:
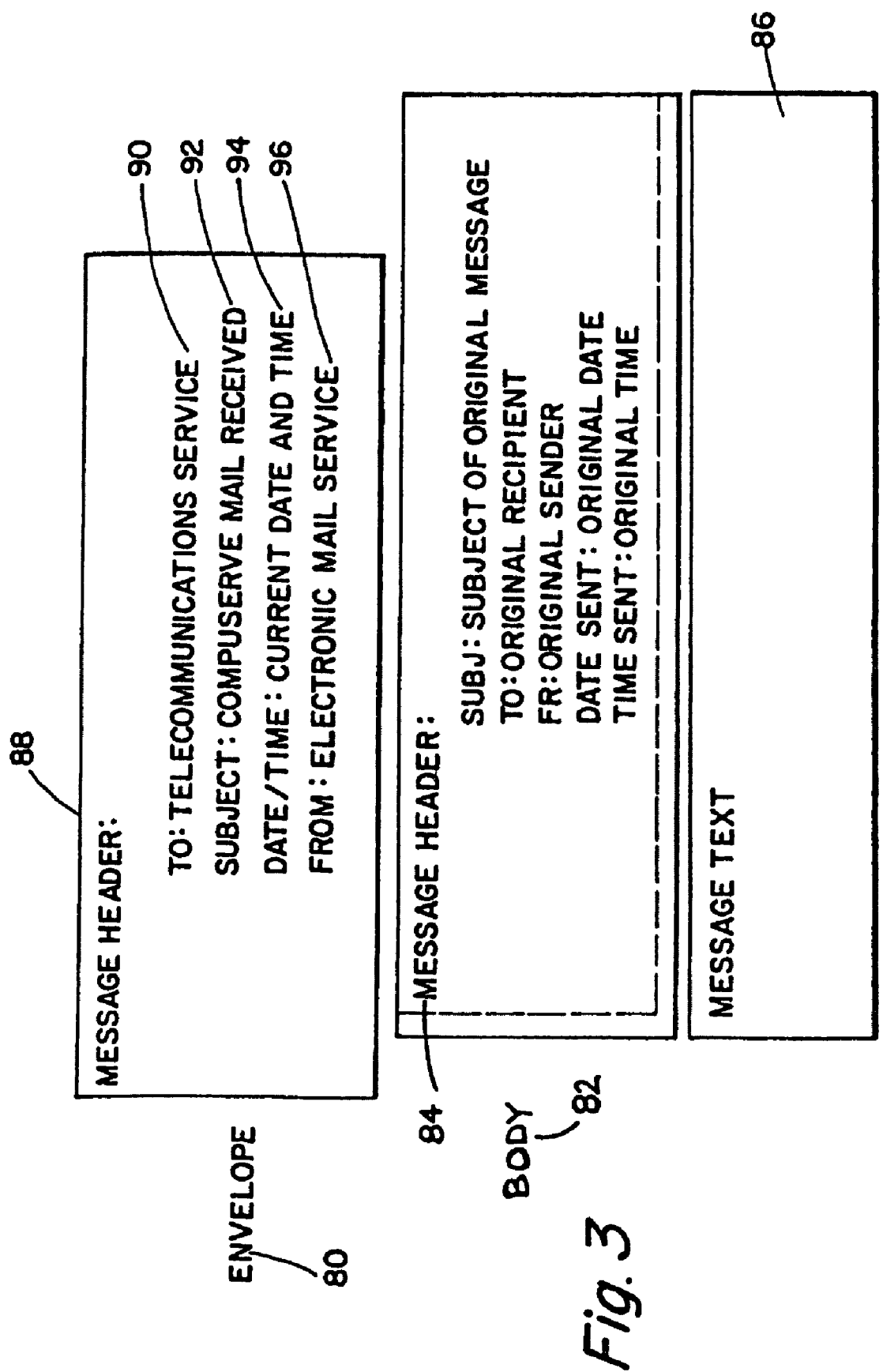
FIG. 3 is a diagrammatic representation of a common message format for a preferred embodiment of the present invention.

Referring to FIG. 3, a common message format for messages exchanged between the electronic mail service and telecommunications service is shown. Preferably, the message is comprised of an envelope 80 and a body 82. The body of the common message format is preferably the original message sent by the message sender. The original message is preferably comprised in part of a message header 84 that identifies the subject of the original message, the recipient of the original message, the sender of the original message, and the date and time the original message was sent. The original message also contains the text of the original message 86. In the common message format, the envelope 80, preferably, is comprised of a message header 88 that includes several fields with information that allow the message to be processed at either the telecommunications service or the electronic mail service. A first field 90 may identify the telecommunications or electronic mail service provider to which the message may be forwarded. The message header of the envelope 88 may also include a field with a subject line 92 that refers to the telecommunications or electronic mail service as well as a field with the date and time the original message was modified 94. Finally, the message header of the envelope 88 may include a field that identifies the message sender 96 as the telecommunications or electronic mail service rather than the original message sender.

Modifying the original message to include a new envelope allows electronic messages to be exchanged between an electronic mail service and a telecommunications service. Messages are exchanged between mailboxes designated for use by the services. One or more distributors located at each service route electronic messages to a central repository for the service so they may be exchanged between the services.

After messages arrive at the designated service, they may be sent to and stored in mailboxes associated with individual message receivers for later retrieval by the message receivers. Upon retrieval messages may be converted as needed by additional equipment located at the service and/or at the message receiver's site.

The common message format and the use of the central message repository for each service facilitates the exchange of messages between the electronic mail service and the telecommunications service. The common format is based on known e-mail formats so that messages may be forwarded from the electronic mail service to the telecommunications service, and vice-versa, using standard electronic mail protocols. Using this approach, the telecommunications service appears to the electronic mail service to be part of the electronic mail service global network and another member of the service to whom messages may be forwarded. The telecommunications service may accept all types of messages, including multipart and binary messages, that the electronic mail service is capable of processing. For example, messages processed by the electronic mail service and consequently, the telecommunications service, may include attachments such as voice mail attachments (e.g., xing protocol) and fax mail attachments (e.g., TIFF files). The equipment at the telecommunications service may then be adapted to understand the common message format so that electronic mail messages comprised originally of text may be processed at the telecommunications switch. For example, the original text may be converted through a text-to-speech process so that a message receiver may hear the original message over the telephone. The original text may also be converted to a TIFF image so that the message may be processed through a fax machine.

Using the common message format approach, the telecommunications service appears to the electronic mail service to be another electronic mail service from which electronic mail messages also may be received. Voice mail messages that originate at the telecommunications service may be forwarded to the electronic mail service in accordance with an electronic mail message that has an attached audio file containing the original voice mail message. Computer users may then use connection software to retrieve electronic mail messages including those electronic mail messages associated with audio files. The connection software, which may be equipped with an audio file player, may then, at the user's request, play the voice mail message for the computer user. Alternatively, fax mail messages that originate at the telecommunications service may be forwarded to the electronic mail service in accordance with an electronic mail message that has an attached TIFF file containing the original fax mail message. Computer users may then use connection software to retrieve electronic mail messages including those electronic mail messages associated with fax files. The fax file may be viewed using a fax viewer provided with the connection software.

Although the invention is described in detail with specific reference to a single preferred embodiment and certain alternatives, it is not limited to that particular embodiment or alternative. For example, the configuration of the components that provide the features and functionality of the present invention may change and fall within the scope and spirit of the present invention. The scope of the present invention is defined by the following claims.

What is claimed is:

1. An electronic mail gateway to facilitate delivery of cross-media messages from an online information service to a telecommunications service comprising:

an electronic mail messaging system of an online information service for managing electronic mail messages addressed to subscribers of said online information service;

a subscriber profile database for storing rules to be applied to electronic mail messages arriving at said electronic mail messaging system, said rules comprising subscriber preferences for receiving electronic mail messages at a telecommunications service;

a telecommunications service mailbox associated with said electronic mail messaging system for delivering to said telecommunication service electronic mail messages addressed to said subscribers of said online information service;

an electronic mail distributor connected to said electronic mail messaging system for:

(1) applying said rules to electronic mail messages addressed to said subscribers of said online information service arriving at said electronic mail messaging system;

(2) accessing a telecommunications service routing information database to locate routing information for said telecommunications service mailbox; and (3) modifying said electronic mail messages according to said routing information for routing of said electronic mail messages to said telecommunications service mailbox for receipt by a computer at said telecommunications service that facilitates access to said electronic mail messages by subscribers specifying a preference for receiving electronic mail messages at said telecommunications service.

2. The gateway of claim 1 wherein said electronic mail distributor routes said electronic mail messages to said telecommunications service by formatting and addressing said electronic mail messages for delivery to said telecommunications service mailbox in accordance with a common message format.

3. The gateway of claim 1 wherein said electronic mail distributor routes said electronic mail messages to said telecommunications service by concatenating new routing information to electronic mail messages addressed to subscribers of said online information service specifying a preference for receiving electronic mail messages at said telecommunications service.

4. The gateway of claim 3 wherein said new routing information comprises a sender field identifying said online information service and a receiver field identifying said telecommunications service.

5. The gateway of claim 4 wherein said receiver field identifying said telecommunications service is used to route email messages to said telecommunications service mailbox.

6. The gateway of claim 1 wherein telecommunications service routing information database comprises service name-routing information pairs.

7. The gateway of claim 6 wherein said electronic mail distributor routes electronic mail messages to a telecommunications service according to subscriber profiles comprising a name of a telecommunications service to which electronic mail messages are to be forwarded.

8. A method for facilitating delivery of cross-media messaging from an online information service to a telecommunications service comprising:

(a) associating a telecommunications service mailbox with an electronic mail messaging system of said online information service, said telecommunications service mailbox for receiving electronic mail messages addressed to subscribers of said online information service;

(b) storing in a subscriber profile database rules to be applied to electronic mail messages arriving at said electronic mail messaging system, said rules comprising subscriber preferences for receiving electronic mail messages at said telecommunications service;

(c) applying said rules to electronic mail messages arriving at said electronic mail messaging system of said online information service;

(d) accessing a telecommunications service routing information database to locate routing information for said telecommunications service mailbox;

(e) routing certain ones of said electronic mail messages to said telecommunications service by formatting said electronic mail messages with said routing information for delivery to said telecommunications service mailbox; and (f) processing a request for delivery of said electronic mail messages from said telecommunications service mailbox to a telecommunications service computer that facilitates access to said electronic mail messages by subscribers specifying a preference for receiving electronic mail messages at said telecommunications service.

9. The method of claim 8 wherein routing certain ones of said electronic mail messages to said telecommunications service by formatting said electronic mail messages for delivery to said telecommunications service mailbox comprises formatting said electronic mail messages in accordance with a common message format.

10. The method of claim 8 wherein said routing certain ones of said electronic mail messages to said telecommunications service by formatting and addressing said electronic mail messages for delivery to said telecommunications service mailbox comprises concatenating new routing information to electronic mail messages addressed to subscribers of said online information service specifying a preference for receiving electronic mail messages at said telecommunications service.

11. The method of claim 8 wherein concatenating new routing information to electronic mail messages comprises completing a sender field identifying said online information service and completing a receiver field identifying said telecommunications service.

12. The method of claim 11 wherein routing certain of said electronic mail messages to said telecommunication service comprises routing electronic mail messages to a telecommunications service mailbox identified according to said receiver field.

13. The method of claim 8 wherein routing certain of said electronic mail messages to said telecommunication service comprises accessing a telecommunications service routing information database comprising service name-routing information pairs.

14. A method for delivering electronic mail messages to a telecommunications service for retrieval by recipients of said electronic mail messages comprising the steps of:

(a) accepting at an electronic mail gateway of an online information service an electronic mail message from an electronic messaging system, said electronic mail message comprising an address for delivering said electronic mail message to a recipient mailbox at said online information service;

(b) locating from a profile database a profile associated with a recipient of said electronic mail message, said profile including forwarding instructions;

(c) accessing a telecommunications service routing information database to locate routing information for an electronic mailbox in association with said telecommunications service;

(d) routing said electronic mail message in accordance with said forwarding instructions and said routing information for said electronic mailbox in association with said telecommunications service;

(e) processing at said electronic mail gateway a request for delivery of said electronic mail messages from said electronic mailbox in association with said telecommunications service by a computer that facilitates access to said electronic mail messages by recipients that have specified a preference for receiving electronic mail messages at said telecommunications service.

15. The method of claim 14 wherein routing said electronic mail message comprises modifying said electronic mail message in accordance with a common message format.

16. The method of claim 14 wherein routing said electronic mail message comprises concatenating new routing information to said electronic mail message.

17. The method of claim 16 wherein concatenating new routing information to said electronic mail message comprises adding a sender field identifying an electronic mail service provider and adding a receiver field identifying a telecommunications service provider.

18. The method of claim 17 wherein routing said modified electronic mail message to said electronic mailbox in association with said telecommunications service comprises routing said electronic mail message according to said receiver field.

19. The method of claim 17 wherein routing said electronic mail message to said electronic mailbox in association with said telecommunications service comprises accessing a telecommunications service routing information database comprising service name-routing information pairs.

20. The method of claim 14 wherein locating and converting said electronic mail message for output at said telecommunications service comprises converting said electronic mail message from text to speech.

* * * * *